US007308422B1

(12) United States Patent
Faber et al.

(10) Patent No.: US 7,308,422 B1
(45) Date of Patent: Dec. 11, 2007

(54) SYSTEM FOR RECORDING AND DISTRIBUTING RECORDED INFORMATION OVER THE INTERNET

(75) Inventors: Scott Faber, San Francisco, CA (US); Sean Van der Linden, San Francisco, CA (US); Steven Ivan Lurie, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 0 days.

(21) Appl. No.: 09/522,322

(22) Filed: Mar. 9, 2000

Related U.S. Application Data

(63) Continuation-in-part of application No. 09/414,710, filed on Oct. 8, 1999.

(51) Int. Cl.
G06Q 30/00 (2006.01)

(52) U.S. Cl. .............................. 705/26; 705/1; 705/10

(58) Field of Classification Search .................... 705/1, 705/7, 8, 9, 26, 10; 379/265.1, 265.11, 265.12, 379/265.13, 265.14, 266.06
See application file for complete search history.

(56) References Cited

U.S. PATENT DOCUMENTS

| | | | |
|---|---|---|---|
| 4,313,035 A | 1/1982 | Jordan et al. | |
| 4,577,065 A | 3/1986 | Frey et al. | |
| 4,631,428 A | 12/1986 | Grimes ....................... | 307/475 |
| 4,645,873 A | 2/1987 | Chomet | |
| 4,677,434 A | 6/1987 | Fascenda ..................... | 380/23 |
| 4,723,283 A | 2/1988 | Nagasawa et al. ............ | 380/20 |
| 4,751,669 A | 6/1988 | Sturgis et al. .............. | 364/900 |
| 4,752,675 A | 6/1988 | Zetmeir | |
| 4,847,890 A | 7/1989 | Solomon et al. | |
| 4,878,239 A | 10/1989 | Solomon et al. | |
| 4,969,185 A | 11/1990 | Dorst et al. | |
| 5,018,917 A | 5/1991 | Fisher et al. | |

(Continued)

FOREIGN PATENT DOCUMENTS

AU  699785  5/1995

(Continued)

OTHER PUBLICATIONS

Turco, Franco. "Legislature is Planned to Hem in 'Scooplines' Covers Revealing Rates, Blocking Service." Arizona Republic, Final Edition, Valley & State Section, p. B8, Jan. 16, 1988.*

(Continued)

Primary Examiner—Susanna M. Diaz
(74) Attorney, Agent, or Firm—John P. Ward; Greenberg Traurig LLP

(57) ABSTRACT

A system for recording and distributing information is described. The system includes a controller computer capable of establishing a communications connection via a communications interface with information providers and users. The controller computer also maintains a web site through which information providers can list and describe the information services to be distributed through the web site and through which users can browse to find information services to purchase. Information providers record information over the communications connection, which is stored in a database maintained on the controller computer. Users select to receive recorded information, which is delivered over the communications connection by the controller computer. The controller computer further has the capability of automatically billing users and crediting information providers for the information.

35 Claims, 10 Drawing Sheets

U.S. PATENT DOCUMENTS

| | | | |
|---|---|---|---|
| 5,058,152 A | 10/1991 | Solomon et al. | |
| 5,148,474 A | 9/1992 | Haralambopoulos et al. | 379/111 |
| 5,155,743 A | 10/1992 | Jacobs | |
| 5,206,903 A | 4/1993 | Kohler et al. | |
| 5,319,542 A | 6/1994 | King, Jr. et al. | 364/401 |
| 5,325,424 A | 6/1994 | Grube | 379/94 |
| 5,347,632 A | 9/1994 | Filepp et al. | 395/200 |
| 5,359,508 A | 10/1994 | Rossides | 364/401 |
| 5,361,295 A | 11/1994 | Solomon et al. | |
| 5,369,694 A | 11/1994 | Bales et al. | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,497,502 A | 3/1996 | Castille | 455/5.1 |
| 5,524,146 A | 6/1996 | Morrisey et al. | |
| 5,537,314 A | 7/1996 | Kanter | 364/406 |
| 5,539,735 A | 7/1996 | Moskowitz | 370/60 |
| 5,555,298 A | 9/1996 | Jonsson | 379/207 |
| 5,557,677 A | 9/1996 | Prytz | 380/20 |
| 5,574,780 A | 11/1996 | Andruska et al. | |
| 5,574,781 A | 11/1996 | Blaze | |
| 5,589,892 A | 12/1996 | Knee et al. | |
| 5,590,197 A | 12/1996 | Chen et al. | 380/24 |
| 5,596,634 A | 1/1997 | Fernandez et al. | |
| 5,602,905 A | 2/1997 | Mettke | 379/96 |
| 5,604,803 A | 2/1997 | Aziz | |
| 5,608,786 A | 3/1997 | Gordon | |
| 5,615,213 A | 3/1997 | Griefer | |
| 5,619,148 A | 4/1997 | Sloane | |
| 5,619,570 A | 4/1997 | Tsutsui | 380/4 |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | 395/239 |
| 5,638,432 A | 6/1997 | Wille et al. | 379/121 |
| 5,651,058 A | 7/1997 | Hackett-Jones et al. | |
| 5,668,953 A | 9/1997 | Sloo | |
| 5,675,734 A | 10/1997 | Hair | 395/200.01 |
| 5,694,163 A | 12/1997 | Harrison | |
| 5,694,537 A | 12/1997 | Montenegro et al. | |
| 5,694,549 A | 12/1997 | Carlin et al. | 395/200.2 |
| 5,701,419 A | 12/1997 | McConnell | |
| 5,710,887 A | 1/1998 | Chelliah et al. | 395/226 |
| 5,712,979 A | 1/1998 | Graber et al. | 395/200.11 |
| 5,715,314 A | 2/1998 | Payne et al. | 380/24 |
| 5,717,860 A | 2/1998 | Graber et al. | 395/200.12 |
| 5,718,247 A | 2/1998 | Frankel | 128/898 |
| 5,721,763 A | 2/1998 | Joseph et al. | 379/88 |
| 5,722,418 A | 3/1998 | Bro | 128/732 |
| 5,724,424 A | 3/1998 | Gifford | 380/24 |
| 5,734,961 A | 3/1998 | Castille | 455/5.1 |
| 5,740,231 A | 4/1998 | Cohn et al. | 379/89 |
| 5,745,681 A | 4/1998 | Levine et al. | 395/200.3 |
| 5,768,348 A | 6/1998 | Solomon et al. | |
| 5,768,521 A | 6/1998 | Dedrick | 397/200.54 |
| 5,774,534 A | 6/1998 | Mayer | |
| 5,778,367 A | 7/1998 | Wesinger, Jr. et al. | 707/10 |
| 5,781,894 A | 7/1998 | Patrecca et al. | |
| 5,794,210 A | 8/1998 | Goldhaber et al. | |
| 5,794,221 A | 8/1998 | Egendorf | 705/40 |
| 5,802,502 A | 9/1998 | Gell et al. | |
| 5,809,119 A | 9/1998 | Tonomura et al. | 379/112 |
| 5,809,145 A | 9/1998 | Slik et al. | 380/25 |
| 5,812,769 A | 9/1998 | Graber et al. | 395/200.12 |
| 5,818,836 A | 10/1998 | DuVal | |
| 5,819,092 A | 10/1998 | Ferguson et al. | 395/701 |
| 5,819,267 A | 10/1998 | Uyama | 707/6 |
| 5,819,271 A | 10/1998 | Mahoney et al. | 707/9 |
| 5,819,285 A | 10/1998 | Damico et al. | 707/104 |
| 5,825,869 A | 10/1998 | Brooks et al. | 379/265 |
| 5,825,876 A | 10/1998 | Peterson, Jr. | 380/4 |
| 5,832,523 A | 11/1998 | Kanai et al. | 707/204 |
| 5,835,896 A | 11/1998 | Fisher et al. | |
| 5,842,212 A | 11/1998 | Ballurio et al. | 707/100 |
| 5,850,433 A | 12/1998 | Rondeau | 379/201 |
| 5,860,068 A | 1/1999 | Cook | 705/26 |
| 5,862,223 A | 1/1999 | Walker et al. | 380/25 |
| 5,864,871 A | 1/1999 | Kitain et al. | 707/104 |
| 5,870,744 A | 2/1999 | Sprague | 707/9 |
| 5,878,130 A | 3/1999 | Andrews et al. | 379/265 |
| 5,884,032 A | 3/1999 | Bateman et al. | 395/200.34 |
| 5,884,272 A | 3/1999 | Walker et al. | 705/1 |
| 5,884,282 A | 3/1999 | Robinson | 705/27 |
| 5,889,774 A | 3/1999 | Mirashrafi et al. | |
| 5,890,138 A | 3/1999 | Godin et al. | |
| 5,893,077 A | 4/1999 | Griffin | 705/34 |
| 5,901,214 A | 5/1999 | Shaffer et al. | |
| 5,903,635 A | 5/1999 | Kaplan | |
| 5,903,877 A | 5/1999 | Berkowitz et al. | |
| 5,907,077 A | 5/1999 | Glenn et al. | |
| 5,907,677 A | 5/1999 | Glenn et al. | 395/200.36 |
| 5,911,132 A | 6/1999 | Sloane | |
| 5,914,951 A | 6/1999 | Bentley et al. | 370/352 |
| 5,915,214 A | 6/1999 | Reece et al. | |
| 5,924,082 A | 7/1999 | Silverman et al. | |
| 5,937,390 A | 8/1999 | Hyodo | |
| 5,940,471 A | 8/1999 | Homayoun | 379/1 |
| 5,940,484 A | 8/1999 | DeFazio et al. | |
| 5,943,422 A | 8/1999 | Van Wie et al. | |
| 5,946,646 A | 8/1999 | Schena et al. | |
| 5,948,054 A | 9/1999 | Nielsen | |
| 5,960,416 A | 9/1999 | Block | |
| 5,974,141 A | 10/1999 | Saito | 380/4 |
| 5,974,398 A | 10/1999 | Hanson et al. | |
| 5,982,863 A | 11/1999 | Smiley et al. | 379/112 |
| 5,987,102 A | 11/1999 | Elliott et al. | |
| 5,987,118 A | 11/1999 | Dickerman et al. | |
| 5,987,430 A | 11/1999 | Van Horne et al. | 705/34 |
| 5,991,394 A | 11/1999 | Dezonno et al. | 379/265 |
| 5,999,609 A | 12/1999 | Nishimura | 379/201 |
| 5,999,611 A | 12/1999 | Tatchell et al. | |
| 6,006,197 A | 12/1999 | d-Eon et al. | |
| 6,011,794 A | 1/2000 | Mordowitz et al. | |
| 6,014,439 A | 1/2000 | Walker et al. | |
| 6,014,644 A | 1/2000 | Erickson | |
| 6,016,478 A | 1/2000 | Zhang et al. | |
| 6,026,087 A | 2/2000 | Mirashrafi et al. | |
| 6,026,148 A | 2/2000 | Dworkin et al. | 379/88.18 |
| 6,026,400 A | 2/2000 | Suzuki | 707/6 |
| 6,028,601 A | 2/2000 | Machiraju et al. | |
| 6,029,141 A | 2/2000 | Bezos et al. | |
| 6,035,021 A | 3/2000 | Katz | |
| 6,046,762 A | 4/2000 | Sonesh et al. | |
| 6,055,513 A | 4/2000 | Katz et al. | 705/26 |
| 6,058,379 A | 5/2000 | Odom et al. | |
| 6,064,978 A | 5/2000 | Gardner | |
| 6,067,561 A | 5/2000 | Dillon | |
| 6,078,866 A | 6/2000 | Buck et al. | |
| 6,130,933 A | 10/2000 | Miloslavsky | |
| 6,131,085 A * | 10/2000 | Rossides | 705/1 |
| 6,144,670 A | 11/2000 | Sponaugle et al. | |
| 6,167,379 A | 12/2000 | Dean et al. | |
| 6,167,449 A | 12/2000 | Arnold et al. | |
| 6,173,279 B1 | 1/2001 | Levin et al. | |
| 6,175,619 B1 | 1/2001 | DeSimone | |
| 6,185,194 B1 | 2/2001 | Musk et al. | |
| 6,185,289 B1 | 2/2001 | Hetz et al. | |
| 6,188,673 B1 | 2/2001 | Bauer et al. | |
| 6,188,761 B1 | 2/2001 | Dickerman et al. | |
| 6,192,050 B1 | 2/2001 | Stovall | |
| 6,199,096 B1 | 3/2001 | Mirashrafi et al. | |
| 6,212,192 B1 | 4/2001 | Mirashrafi et al. | |

| | | | | | |
|---|---|---|---|---|---|
| 6,212,268 B1 | 4/2001 | Nielsen | 7,032,030 B1 * | 4/2006 | Codignotto ............... 709/246 |
| 6,216,111 B1 | 4/2001 | Walker et al. | 2001/0012357 A1 | 8/2001 | Mirashrafi et al. |
| 6,223,165 B1 | 4/2001 | Lauffer | 2001/0025274 A1 | 9/2001 | Zehr et al. |
| 6,230,287 B1 | 5/2001 | Pinard et al. | 2001/0026609 A1 | 10/2001 | Weinstein et al. |
| 6,233,566 B1 | 5/2001 | Levine et al. | 2001/0027481 A1 | 10/2001 | Whyel |
| 6,243,684 B1 | 6/2001 | Stuart et al. | 2001/0029482 A1 | 10/2001 | Tealdi et al. |
| 6,246,875 B1 | 6/2001 | Seazholtz et al. | 2001/0032247 A1 | 10/2001 | Kanaya |
| 6,248,946 B1 * | 6/2001 | Dwek ..................... 84/609 | 2001/0036822 A1 | 11/2001 | Mead et al. |
| 6,259,774 B1 | 7/2001 | Miloslavsky et al. | 2001/0037283 A1 | 11/2001 | Mullaney |
| 6,266,651 B1 | 7/2001 | Woolston | 2001/0044751 A1 | 11/2001 | Pugliese et al. |
| 6,269,336 B1 | 7/2001 | Ladd et al. | 2001/0048737 A1 | 12/2001 | Goldberg et al. |
| 6,269,361 B1 | 7/2001 | Davis et al. | 2002/0003867 A1 | 1/2002 | Rothschild et al. |
| 6,282,515 B1 * | 8/2001 | Speicher ..................... 705/14 | 2002/0010608 A1 | 1/2002 | Faber et al. |
| 6,292,799 B1 | 9/2001 | Peek et al. | 2002/0010616 A1 | 1/2002 | Itzhaki |
| 6,298,056 B1 | 10/2001 | Pendse | 2002/0024948 A1 | 2/2002 | Pendse |
| 6,301,342 B1 | 10/2001 | Ander et al. | 2002/0029241 A1 * | 3/2002 | Yokono et al. ............. 709/202 |
| 6,304,637 B1 | 10/2001 | Mirashrafi et al. | 2002/0038233 A1 | 3/2002 | Shubov et al. |
| 6,310,941 B1 | 10/2001 | Crutcher et al. | 2002/0038293 A1 | 3/2002 | Seiden |
| 6,311,231 B1 | 10/2001 | Bateman et al. | 2002/0042826 A1 | 4/2002 | Gaus et al. |
| 6,314,402 B1 | 11/2001 | Monaco et al. | 2002/0059082 A1 | 5/2002 | Moczygemba |
| 6,314,454 B1 | 11/2001 | Wang et al. | 2002/0065959 A1 | 5/2002 | Kim et al. |
| 6,323,894 B1 | 11/2001 | Katz | 2002/0071423 A1 | 6/2002 | Mirashrafi et al. |
| 6,353,663 B1 | 3/2002 | Stevens et al. | 2002/0071426 A1 | 6/2002 | Karamchedu et al. |
| 6,385,583 B1 | 5/2002 | Ladd et al. | 2002/0072974 A1 | 6/2002 | Pugliese et al. |
| 6,389,278 B1 | 5/2002 | Singh | 2002/0073207 A1 | 6/2002 | Widger et al. |
| 6,389,541 B1 | 5/2002 | Patterson | 2002/0087565 A1 | 7/2002 | Hoekman et al. |
| 6,393,117 B1 | 5/2002 | Trell | 2002/0091607 A1 | 7/2002 | Sloan et al. |
| 6,393,412 B1 | 5/2002 | Deep | 2002/0095331 A1 | 7/2002 | Osmar et al. |
| 6,400,806 B1 | 6/2002 | Uppaluru | 2002/0095359 A1 | 7/2002 | Mangetsu |
| 6,404,864 B1 | 6/2002 | Evslin et al. | 2002/0107697 A1 | 8/2002 | Jensen |
| 6,404,877 B1 | 6/2002 | Bolduc et al. | 2002/0112005 A1 * | 8/2002 | Namias ..................... 709/206 |
| 6,404,884 B1 | 6/2002 | Marwell et al. | 2002/0116266 A1 | 8/2002 | Marshall |
| 6,430,276 B1 | 8/2002 | Bouvier et al. | 2002/0120554 A1 | 8/2002 | Vega |
| 6,434,527 B1 | 8/2002 | Horvitz | 2002/0128891 A1 | 9/2002 | McSherry |
| 6,463,136 B1 | 10/2002 | Malik | 2002/0133402 A1 | 9/2002 | Faber et al. |
| 6,470,079 B1 | 10/2002 | Benson | 2002/0133570 A1 | 9/2002 | Jacob et al. |
| 6,470,317 B1 | 10/2002 | Ladd et al. | 2002/0133571 A1 | 9/2002 | Jacob et al. |
| 6,470,338 B1 | 10/2002 | Rizzo et al. | 2002/0169836 A1 | 11/2002 | Hood et al. |
| 6,477,246 B1 | 11/2002 | Dolan et al. | 2002/0191762 A1 | 12/2002 | Benson |
| 6,484,148 B1 | 11/2002 | Boyd | 2002/0193094 A1 | 12/2002 | Lawless et al. |
| 6,493,437 B1 | 12/2002 | Olshansky | 2002/0193135 A1 | 12/2002 | Nakano |
| 6,493,671 B1 | 12/2002 | Ladd et al. | 2003/0005126 A1 | 1/2003 | Schwartz et al. |
| 6,493,673 B1 | 12/2002 | Ladd et al. | 2003/0043981 A1 | 3/2003 | Lurie et al. |
| 6,510,417 B1 | 1/2003 | Woods et al. | 2003/0046161 A1 | 3/2003 | Kamanger et al. |
| 6,513,013 B1 | 1/2003 | Stephanou | 2003/0061094 A1 | 3/2003 | Banerjee et al. |
| 6,523,010 B2 * | 2/2003 | Lauffer ..................... 705/8 | 2003/0112944 A1 | 6/2003 | Brown et al. |
| 6,523,101 B1 | 2/2003 | Lauffer | 2003/0220866 A1 | 11/2003 | Pisaris-Henderson |
| 6,529,878 B2 | 3/2003 | De Rafael et al. | 2003/0223565 A1 | 12/2003 | Montemer |
| 6,539,359 B1 | 3/2003 | Ladd et al. | 2003/0225682 A1 | 12/2003 | Montemer |
| 6,542,732 B1 | 4/2003 | Khazaka et al. | 2004/0006511 A1 | 1/2004 | Montemer |
| 6,546,372 B2 * | 4/2003 | Lauffer ..................... 705/8 | 2004/0010518 A1 | 1/2004 | Montemer |
| 6,549,889 B2 * | 4/2003 | Lauffer ..................... 705/8 | 2004/0023644 A1 | 2/2004 | Montemer |
| 6,560,576 B1 | 5/2003 | Cohen et al. | 2004/0066927 A1 | 4/2004 | Horvath et al. |
| 6,563,915 B1 | 5/2003 | Salimando | 2004/0083133 A1 | 4/2004 | Nicholas et al. |
| 6,606,376 B1 | 8/2003 | Trell | 2004/0096110 A1 | 5/2004 | Yogeshwar et al. |
| 6,609,106 B1 | 8/2003 | Robertson | 2004/0162757 A1 | 8/2004 | Pisaris-Henderson |
| 6,611,501 B1 | 8/2003 | Owen et al. | 2005/0065811 A1 | 9/2004 | Dunham |
| 6,625,595 B1 | 9/2003 | Anderson et al. | 2004/0204997 A1 | 10/2004 | Blaser et al. |
| 6,636,590 B1 | 10/2003 | Jacob et al. | 2004/0234049 A1 | 11/2004 | Melideo |
| 6,658,389 B1 | 12/2003 | Alpdemir | 2004/0234064 A1 | 11/2004 | Melideo |
| 6,668,286 B2 | 12/2003 | Bateman et al. | 2004/0236441 A1 | 11/2004 | Melideo |
| 6,731,625 B1 | 5/2004 | Eastep et al. | 2004/0254859 A1 | 12/2004 | Aslanian, Jr. |
| 6,741,691 B1 | 5/2004 | Ritter et al. | 2004/0258048 A1 | 12/2004 | Melideo |
| 6,757,364 B2 | 6/2004 | Newkirk | 2004/0260413 A1 | 12/2004 | Melideo |
| 6,771,760 B1 | 8/2004 | Vortman et al. | 2005/0010795 A1 * | 1/2005 | Tagawa et al. ............. 713/193 |
| 6,775,359 B1 | 8/2004 | Ron et al. | 2005/0021744 A1 | 1/2005 | Haitsuka et al. |
| 6,798,753 B1 | 9/2004 | Doganata et al. | 2005/0044238 A1 | 2/2005 | Jacob et al. |
| 6,801,899 B2 | 10/2004 | Lauffer | 2005/0048961 A1 | 3/2005 | Ribaudo et al. |
| 6,807,532 B1 | 10/2004 | Kolls | 2005/0080878 A1 | 4/2005 | Cunningham et al. |
| 6,836,225 B2 | 12/2004 | Lee et al. | 2005/0086104 A1 | 4/2005 | McFadden |
| 6,865,540 B1 | 3/2005 | Faber et al. | 2005/0165666 A1 | 7/2005 | Wong et al. |
| 6,898,435 B2 | 5/2005 | Milman | 2005/0203799 A1 | 9/2005 | Faber et al. |
| 6,968,174 B1 | 11/2005 | Trandal et al. | 2005/0209874 A1 | 9/2005 | Rossini |

| | | | |
|---|---|---|---|
| 2005/0216341 | A1 | 9/2005 | Agarwal et al. |
| 2005/0216345 | A1 | 9/2005 | Altberg et al. |
| 2005/0220289 | A1 | 10/2005 | Reding |
| 2005/0222908 | A1 | 10/2005 | Altberg et al. |
| 2005/0251445 | A1 | 11/2005 | Wong et al. |
| 2006/0095343 | A1 | 5/2006 | Clark et al. |

FOREIGN PATENT DOCUMENTS

| | | | |
|---|---|---|---|
| GB | 2329046 A | | 10/1999 |
| JP | 409233441 A | | 9/1997 |
| JP | 409319812 A | | 12/1997 |
| JP | 409319812 A | | 12/1997 |
| JP | 2002007887 A | * | 1/2002 |
| WO | WO 97/05733 | | 2/1997 |
| WO | WO 98/02835 | | 1/1998 |
| WO | WO 98/04061 | | 1/1998 |
| WO | WO 98/13765 | | 4/1998 |
| WO | WO 98/38558 | | 9/1998 |
| WO | 0057326 | | 9/2000 |
| WO | 0073960 | | 12/2000 |
| WO | 0101217 | | 1/2001 |
| WO | WO 01/20518 A1 | * | 3/2001 |
| WO | 0127825 | | 4/2001 |
| WO | 0144973 | | 6/2001 |
| WO | WO 02/44870 | | 6/2002 |
| WO | PCT/US01/51181 | | 3/2003 |

OTHER PUBLICATIONS

Alexander et al. "1-900 (Pay-For-Information Phone Services." Baton Rouge Business Report, vol. 9, No. 20, p. 23(5), Jul. 30, 1991.*

"Keen.com™, the Most Popular U.S. Question and Answer Marketplace, Goes International 90 Days After Launch." PR Newswire, Mar. 13, 2000.*

Kempner, Matt. "SWM Seeking—the Net Rather than Newspapers." Atlanta Journal the Altanta Constitution, p. Q.1, Sep. 10, 2000.*

Michael Kanellos, "Do You Want To Know The Meaning of Life?", Computer Reseller News, Mar. 3, 1997, pp. 72-74.

"Applying Technology News", Acccounting Technology, Feb./Mar. 1997, p. 14.

Ellen Greenblatt, "Have you ever wondered . . . ", Datamation, Oct. 1997, p. 126.

"Information for sale: Commerical Digital Reference and AskA Services", Virtual Reference Desk, Sep. 20, 1999, at www.vrd.org/AskA/commAskA.html.

EXP.com Web Site at www.exp.com/.

The Web Site at www.experts-exchange,com/.

Electronic Emissary at www.tapr.org/emissary/.

The Web Site at www.allexperts.com/.

"Walker Digital Issued Landmark U.S. Patent No. 5,862,223 for Global Internet Marketplace for Experts", Business Wire, Jan. 26, 1999.

Qcircuit Web Site (www.qcircuit.com).

Infomarkets.com Web Site (www.infomarkets.com).

Intellect Exchange Web Site (www.intellectexchange.com).

Answers.com Web Page (www.answers.com).

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22-24.

"Surfbrains.com: Brains online save time & money", M2 Presswire, Jul. 11, 2000.

Cynthia Hodgson, "Online Expert Databases & Services", Econtent, Dec. 1999, p. 48-53.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

"USA Global Link Brings Interactively to Internet Shopping", Business Wire., Oct. 1998.

"Lucent Technology and Netscape Team to Deliver Lucent Ecommerce Solutions", Business Wire, Sep. 1998.

"TriNet's, Help Me, I'm Stuck, Internet Voice Button Services Pushes Web Pages to Online Users", Business Wire, Mar. 1998.

Tehrani, Rich, "e-Rip Van Winkle and the 60 second Nap", Call Center Solution, vol. 18, No. 2, pp. 16(3)., Aug. 1999.

"Netcall Internet Call Buttons Enhance E-Commerce Customer Service and Sales", PR Newswire, p. 7431., Aug. 1999.

"Connecting to On-Line Car Shoppers: Auto Sellers Use Netcall Internet Call -Button Technology to Turn Clicks into Interactive Sales", Business Wire, p. 4089., Jul. 1999.

Davey, Tom, "Wheeling and Dealing Online", PC Week, vol. 13, No. 45, pp. 1, 129., Nov. 1996.

Collett, Stacey & Julie King, "Why Online Browsers Don't Become Buyers", Computerworld, vol. 33, No. 48, p. 14.

Information about Expertcity.com retrieved from the Internet [URL: http://www.expertcity.com] on Nov. 6, 2000.

"Rent-An Expert On the Web", Information Week, p. 75, Sep. 1999.

"Expercity.com Launches Premier Online Marketplace for Expert Services", PR Newswire, Aug. 1999.

Information about keen.com retrieved form the Internet [URL: http://www.keen.com] , on Oct. 24, 2000.

John Healey, From A-Z, "You Can Sell Advice Online", Mercury News [retrieved from http://wwwO.mercurycenter.com on Oct. 24, 2001.

Jeff Peline, "Net Firm to Connect Users by phone", CNET News. com, [retrieved from http://news.cnet.com on Oct. 24, 2001.

"Keen.Com Launches First Live Answer Community", Press release retrieved from http://www.keen.com on Oct. 24, 2000.

Joseph Menn, "An Expert? There's Now a Home for You on the Internet", Los Angeles Times [retrieved from http://www.denverpost.com on Oct. 24, 2001.

The Voice of Technology, Credit World, pp. 20-23, Jul. 1994.

Telecommunications Buyers Guide and Directory, Editor & Publisher, pp. 29TC-38TC, Feb. 1994.

Aspect Telecomm: Aspect Integrates the Web into the Call Center, M2 Presswire, Aug. 1996.

Information, Bid and Asked, Forbes, Aug. 20, 1990, 92.

Attachmate Ready to Answer Net questions, Network World, Apr. 8, 1996, 37.

US Courts to Launch First Federal 900 Service, Federal Computer Week, Sep. 28, 1992, 8.

Company Devoted to Hot-Line Support, Computer Reseller News, Oct. 21, 1991, 48.

For Telesphere's Clients, Dial '1-900-TUF LUCK',Business Week, Sep. 9, 1991, 98.

When Business Plan and real World Clash, Wall Street Journal, Jun. 9, 1999, B1.

Hidden Cost of Tech Support, PC World, May 1995, 143.

NetBazaar: Networked Electronic Markets for Trading Computation and Information Services, ECDL 1998—Research and Advanced Technology for Digital Libraries, 839.

Multimedia Collaborative Remote Consultation Tools via Gigabit WAN in Teleradiology, IEEE 1994 Phoenix, 417.

Multimedia Communication in a Medical Environment, IEEE 1991 Singapore I.C. on Networks, 166.

A New Teleconsultation Terminal System Using ISDN, NTT Review, Jul. 1991, 37.

MiniPay: Charging Per Click on the Web, CNISDN, 1997, v29, 939.

Caring for Customers: Real-time text chat and telephony provide personalized customer support and turn queries into sales leads, Internet World Media, Sep. 1990.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

Masahiko Hase, Shuji Kawakubo and Mineo Shoman, "Advanced Videophone System Using Synchronized Video Filing Equipment," NTT Review, vol. 3, No. 4 Jul. 1991, pp. 29-36.

Franco Mercalli and Roberto Negrini, "The ESSAI Teleshopping System: An Example of a Broadband Multimedia Application," Publication No. 0-7803-1820-X/94, IEEE, 1994, pp. 572-576.

Abhaya Asthana and Paul Krzyzanowski, "A Small Domain Communications System for Personalized Shopping Assistance," Proceedings of ICPWC'94, Publication No. 0-7803-1996-6/94, IEEE, 1994, pp. 199-203.

Linda Littleton, "Meet the Shadowy Future," Proceedings ACM SIGUCCS User Services Conference XXII, Ypsilanti, Michigan Oct. 16-19, 1994, pp. 205-210.

L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.

E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.

ISDN Tutorial:Definitions, http://www.ralphb.net/ISDN/defs.html , printed on Apr. 21, 2000.

ISDN Tutorial: Interfaces, http://www.ralphb.net/ISDN/ifaces. html , printed on Apr. 21, 2000.

U.S. Appl. No. 09/596,466, filed Jun. 19, 2000, Agdeppa.

U.S. Appl. No. 60/198,642, filed Apr. 20, 2000, Rothschild et al.

U.S. Appl. No. 60/471,535, filed May 19, 2003, Melideo.

Big Green Blog: Jan. 2005 Archives, Feb. 21, 2006.

Information about Expertcity.com retrieved from the Internet [URL:http://www.expertcity.com] on Apr. 9, 2000.

Ingenio Press Archives for 2004, www.ingenio.com, Feb. 21, 2006.

"Introducing 1-800-FREE411: First Nationwide Free Telephone Directory Assistance Service" Jingle Networks, Inc., Huntington Beach, Calif., Sep. 20, 2005.

ISDN Tutorial:Interfaces, http://www.ralphb.net/ISDN/ifaces.html, printed on Apr. 21, 2000.

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners. Others", Agoura Hills, Calif., Oct. 17, 2005.

Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17pgs. of attachments.

Keen.com, Inc. v. InfoRocket.com, Inc., Preliminary Injunction Hearing, pp. 286-289 (Jan. 8, 2002).

Keen.com Feb. 4, 2006.

Keen.com Plans Web Service Allowing Customers to Hold Private Phone Chats. Don Clark, Wall Streat Journal, Nov. 8, 1999.

Keen.com raises $60 Million from Prestigious . . . , Business Wire, Jan. 11, 2000.

PCT Search Report for PCT Application No. PCT/US01/48284, filed Oct. 30, 2001 (corresponding to U.S. Appl. No. 09/702,217) mailed May 13, 2002 (7 pgs.).

Sell and buy advice online, The Ottawa Citizen, Nov. 29, 1999.

"UpSnap Selects LookSmart to Sell Premium Listings on FREE 411 Service for Text-Enabled Cell Phones". Nov. 4, 2004.

"Welcome to Jambo—the leader in Pay-per-Call Solutions" (search results) Oct. 17, 2005.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Angelo, Simon, "SurfBrains.com: Brains Online Save Time & Money," M2 Presswire, Jul. 11, 2000.

ANSWERS.COM, company information retrieved from http://www.answers.com, available at least by Aug. 8, 2000.

EK, Brian, "Walker Digital Issued Landmark U.S. Patent No. 5,862,223 for Global Internet Marketplace for Experts", Business Wire, Jan. 26, 1999.

European Patent Office, Search Report for European Patent Application No. EP4253389.3, Sep. 17, 2004.

Hodgson, Cynthia, "Online Expert Databases & Services," Econtent, pp. 48-53, Dec. 1999.

Information Markets Corp., company information retrieved from http://www.infomarkets.com, available at least by Aug. 8, 2000.

Intellectexchange.com, Inc., company information retrieved from http://www.intellectexchange.com, available at least by Aug. 8, 2000.

Internet Friends Network, company information and FAQ retrieved from www.ifriends.com, available at least by Jul. 28, 1999 (no copy available; cited in parent application).

ISA/US, International Search Report for International Application No. PCT/US2005/012061, 3 pages, Nov. 17, 2006.

Jingle Networks, Inc., "1-800-FREE411 Provides Two Great Opportunities to Aquire New Customers," available at least by Oct. 20, 2005.

Liveperson, Inc., company information retrieved from www.liveperson.com/corporate_site/html/whois/whois_news.asp, available at least by Mar. 22, 2000.

Melideo, John, U.S. Appl. No. 60/471, 535 entitled "HyperDial," filed May 19, 2003.

Ott, Chris, "Making Good on the Information Economy," Denver Business Journal, vol. 51, No. 17, p. 27A, Dec. 17, 1999.

QCIRCUIT.COM, company information retrieved from http://www.qcircuit.com, available at least by Aug. 8, 2000.

Rogers, Michael et al, "Experts Abound at New Web Sites," Library Journal, pp. 22-24, Mar. 1, 2000.

Weise, Elizabeth, "Diving into the Global Villages," USA Today, p. 6D, Jun. 30, 1999 (no copy available; cited in parent application).

* cited by examiner

Optional
Add a photo to your listing
 Personalize your listing with a picture! Send an email with a photo attachment to photos@Keen.com
Your Language(s) You can enter multiple languages.

- ☐ Arabic
- ☐ Danish
- ☐ Finnish
- ☐ Hebrew
- ☐ Korean
- ☐ Spanish
- ☐ Chinese (Cantonese)
- ☐ Dutch
- ☐ French
- ☐ Italian
- ☐ Norwegian
- ☐ Swedish
- ☐ Chinese (Mandarin)
- ☐ English
- ☐ German
- ☐ Japanese
- ☐ Portuguese (BR)
- ☐ Other [ ]

FIG. 4A

San Fran Steven's Listings

| Listing Title 1501 | Listing Type 1502 | Availability 1503 | Feedback Rating 1504 | Rate (per minute) 1505 | Change Listing 1506 |
|---|---|---|---|---|---|
| Sailing Tips 1511 | Recorded 1512 🎧 1513 | Always Available 1514 Last Updated: 2/29/00  1515 | Not Rated 1516 | 25 cents 1517 | Updated Delete Listen |
| Sailing Advisor 1521 | Live Answer 📞 1512 1523 | 1524 ○ Yes (available) ● No (not available) Create Schedule 1525 | Not Rated | 25 cents | Updated Delete |
| Sailing Tricks | Recorded 🎧 1532 1533 | Recording needs to be made. Click update 1534 | Not Rated | 25 cents | Updated Delete Listen |

1510 → (Sailing Tips row)
1520 → (Sailing Advisor row)
1530 → (Sailing Tricks row)
1518 → (right of first row)

1540 → Make your listings stand out
- Add credentials that have been verified by our third-party service.
- Add a photo to your listing by sending an email with an attachment (JPEG or GIF preferred) to photo@Keen.com.

Market yourself on Keen.com.

1550 →
- Attach a link to your listing in your email and/or homepage, and earn $5 for every person you refer who makes or receives two calls.
- Tell your friends about Keen.com and bring them to your listing. Earn $5 for every person you refer who makes or receives two calls.

FIG. 6

SYSTEM FOR RECORDING AND DISTRIBUTING RECORDED INFORMATION OVER THE INTERNET

This application is a continuation-in-part of U.S. application Ser. No. 09/414,710, filed on Oct. 8, 1999 and incorporated by reference in its entirety herein.

The present invention relates generally to electronic commerce using digital and analog networks. More specifically, the present invention relates to a network application for recording and distributing recorded information and for tracking the communication time period and allocating revenue based thereon.

BACKGROUND OF THE INVENTION

Consumers interested in acquiring voice-based services, i.e., services that can be provided over a telephone, must first identify the service provider who is capable of providing the required services. At present, this usually means perusing a telephone directory, which can become frustrating and time-consuming if the service providers telephoned are not immediately available. A phone book (whether a bound paper book or an electronic directory) is also not very effective if the service provider's business category is not known.

Over the years, a number of systems have been developed that partially address this problem. In particular, these include systems that attempt to match potential customers with potential service providers. They range from free bulletin-board-style Internet web sites to sophisticated Internet-based consulting services.

One such system is similar to an electronic "marketplace." Users submit via the Internet a description of the services they need to an Internet-based "exchange." These descriptions include the subject matter of the requested service, time constraints for service delivery, and the proposed price to be paid for the services. The exchange then identifies potential service providers and facilitates bidding for the job by the selected service providers, some of whom may or may not have been selected previously by the user. Once the service providers' bids have been received by the user, the user sends a full job request to one or more service providers of particular interest. The service providers who remain interested in the proposed work then submit a final bid to the user. This bid may also include the expert's particular qualifications and conditions for accepting the work. After the work has been completed, the expert contacts the exchange for payment. Although this system is beneficial, users still do not immediately know if an expert is available and the response from the expert is neither immediate nor direct.

Another prior art system maintains a list of independent professors available for answering questions via the Internet. The system functions as a middleman between the customer and the professors. The customer contacts the system via the Internet with a question. The system then contacts various experts within the appropriate field via the Internet and forwards the customer's question to the experts. Here too, customers do not immediately know if an expert is available, and the response from the expert is not immediate.

There is another system that allows users to post via the Internet questions for experts related to specific topical categories. However, there is no guarantee that an expert will answer the question as the user does not pay for the services and the experts are not paid. Again, presuming the expert is willing to answer a question, users do not immediately know if an expert is available and the response from the expert is not immediate nor direct.

Another system allows users to post questions to an electronic "bulletin board." Other users, whether expert or not, then provide answers or comments on a voluntary basis. This system, though useful, suffers from many of the same problems as the system described above.

In some situations, the expert can provide useful information without having to interact directly with the customer or user. None of the systems described above has the capability of distributing recorded information to a user looking for and willing to pay for such information.

Today, the only viable methods to sell recorded aural information is by offering physical, recorded media (compact discs, cassettes, etc.) or by setting up a 1-900 number with a recorded message. Physical, recorded media such as compact discs are cumbersome and expensive to manufacture and distribute. 1-900 numbers are difficult because information providers cannot update the recording without physically accessing the machine and manually changing the recording to be played. They are also costly to publicize because each 1-900 number must be marketed separately.

SUMMARY OF THE INVENTION

The present invention provides a system through which information can be recorded and distributed. The system includes a controller computer linked with a communications interface. The controller computer has a database, a first logic unit linked with the database to establish via the communications interface a first communications connection with an information provider, and a second logic unit linked with the database to establish via the communications interface a second communications connection with a user. The information from the information provider is recorded over the first communications connection and stored on the database. In response to the user selecting to receive the information, the system delivers the information via the second communications connection to the user. Methods of recording and providing information and of selling recorded information are also provided herewith.

BRIEF DESCRIPTION OF THE DRAWINGS

FIGS. 4 and 4A illustrate one embodiment of a web page for creating a listing for and a description of information in accordance with the present invention.

FIG. 6 illustrates one embodiment of a preview web page for previewing the listings of a service provider in accordance with the present invention.

DETAILED DESCRIPTION OF THE INVENTION

The present invention enables information providers to record, update, and deliver information from anywhere that has communications access, whether through a telephone network, a computer network, wireless communications network, etc. and enables information users to access such information from anywhere that has communications access. In one embodiment, a system according to the present invention establishes a web site, through which the information provider can at any time update the recorded information or the description and price that appear to the user and through which the user can at any time access the recorded information. Upon selecting to receive a desired recording, the user can listen to it through the telephone or other communications device. While the recorded information is being delivered to the user, the user would accrue charges on either a per-time period or lump-sum basis. The information provider would later receive all or part of the accrued charges. The present invention effectively solves all of the logistical problems involved with recording and distributing aural information.

Figure 1:
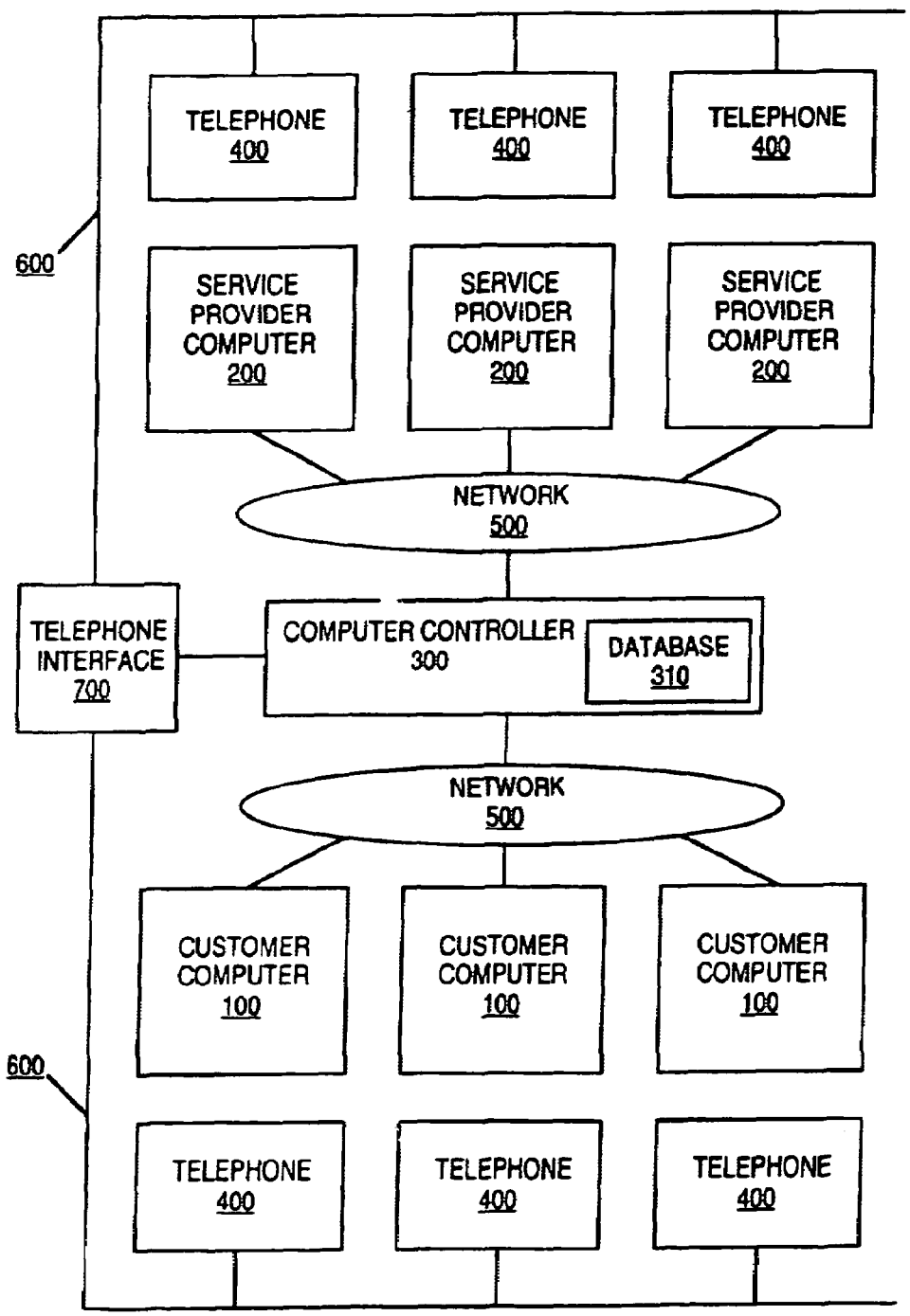
FIG. 1 illustrates a system for recording information from service providers and distributing the information to customers in accordance with one embodiment of the invention.
Figure 2:
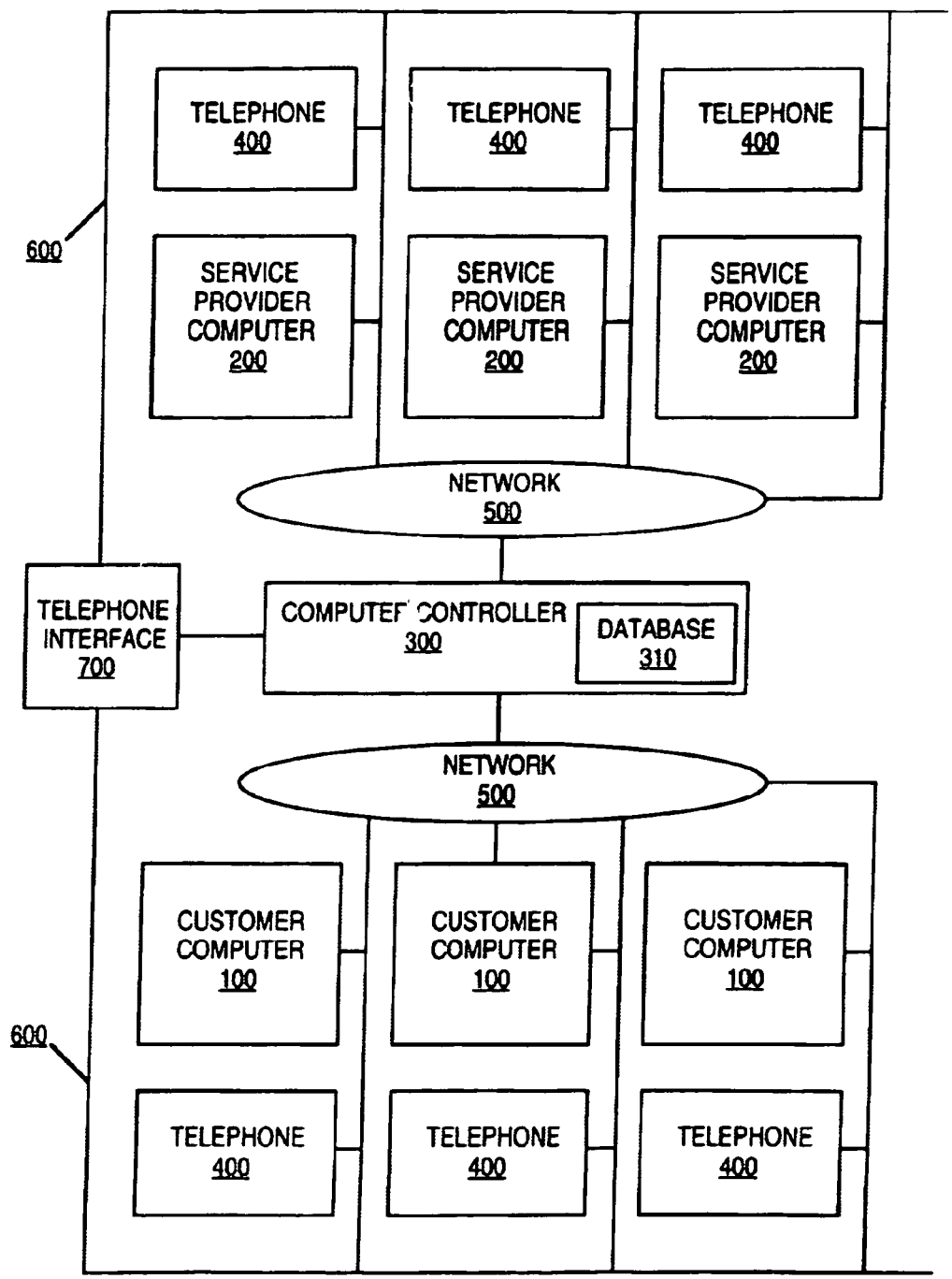
FIG. 2 illustrates an alternative embodiment of a system for recording information from service providers and distributing the information to customers.

As shown in FIG. 1, user computers ("customer computers") 100 and information provider computers ("service provider computers") 200 are connected through a network 500 (such as the Internet) to a host computer or web server ("controller computer") 300. Persons of ordinary skill in the art will recognize that said controller computer 300 may consist of more than one computer working together to provide the controller computer 300 functions described herein. The users (customers) and information providers (service providers) each have telephones 400 that are connected to a telephone network 600. In FIG. 1, the computer network 500 and telephone network 600 are shown as two separate entities, though persons skilled in the art will realize that they may overlap. See FIG. 2.

The controller computer 300 has the functionality of a standard web server, capable of interacting dynamically via the service provider computers 200 and the customer computers 100 with service providers and customers, respectively. In addition to the standard web server operations, the controller computer 300 is linked with a communications interface ("telephone interface") 700 that enables the controller computer 300 to set up, initiate, confirm, and track communications between the customers and service providers, on the one hand, and the controller computer 300 on the other hand. The controller computer 300 has the ability to establish a first communications connection, e.g., a telephone call, with service providers for the purpose of recording and updating information stored in a database 310 maintained on the controller computer 300. The controller computer 300 also has the ability to establish a second communications connection, e.g., a telephone call, with customers for the purpose of distributing the information stored in the database 310.

In accordance with the embodiment shown in FIG. 1, the customer computers 100 and the service provider computers 200 are connected to the controller computer 300 through the network 500. Customers and service providers use their computers to connect to the network 500. Once the connection has been established, customers and service providers enter the URL, or Internet address, of the controller computer 300, and a logic unit within the controller computer 300 establishes a computer connection with the customer computer 100 and the service provider computer 200. In one embodiment, after the computer connection has been established between the controller computer 300 and the service provider and customer computers 200 and 100, respectively, a logic unit within the controller computer presents a web page on the service provider and customer computers 200 and 100, respectively.

Typically, customers and service providers register before customers can purchase services or information and before service providers can offer their services or information through the web site. During registration, the customers and the service providers are requested to submit certain information, such as a username and password. Customers may be requested to submit credit card or other financial information. Service providers may or may not be requested to submit credit card or other financial information. Once the requested information has been submitted, the data is stored in the database 310 in an account set up for the service provider and in a user account set up for the customer.

In one embodiment, a logic unit within the controller computer 300 presents a web page on the customer computer 100 and the service provider computer 200 through which the logic unit prompts the customer and the service provider to submit the requested registration information. The logic unit is linked with the database 310 and so automatically sets up the account and the user account and automatically stores the submitted registration information in the appropriate accounts on the database 310.

Service providers typically submit a description about and/or a listing for each information service they will provide through the web site. In one embodiment, the description and listing are submitted via the computer connection that has been established between the controller computer 300 and the service provider computer 200. Using a web page presented by a logic unit within the controller computer 300 on the service provider computer 200, the service provider typically first submits a valid username and password combination to access the account that has been set up for the service provider. The controller computer 300 will confirm the username and password combination by comparing the submitted data to data stored in the database 310 in the account set up for the service provider.

Figure 3:
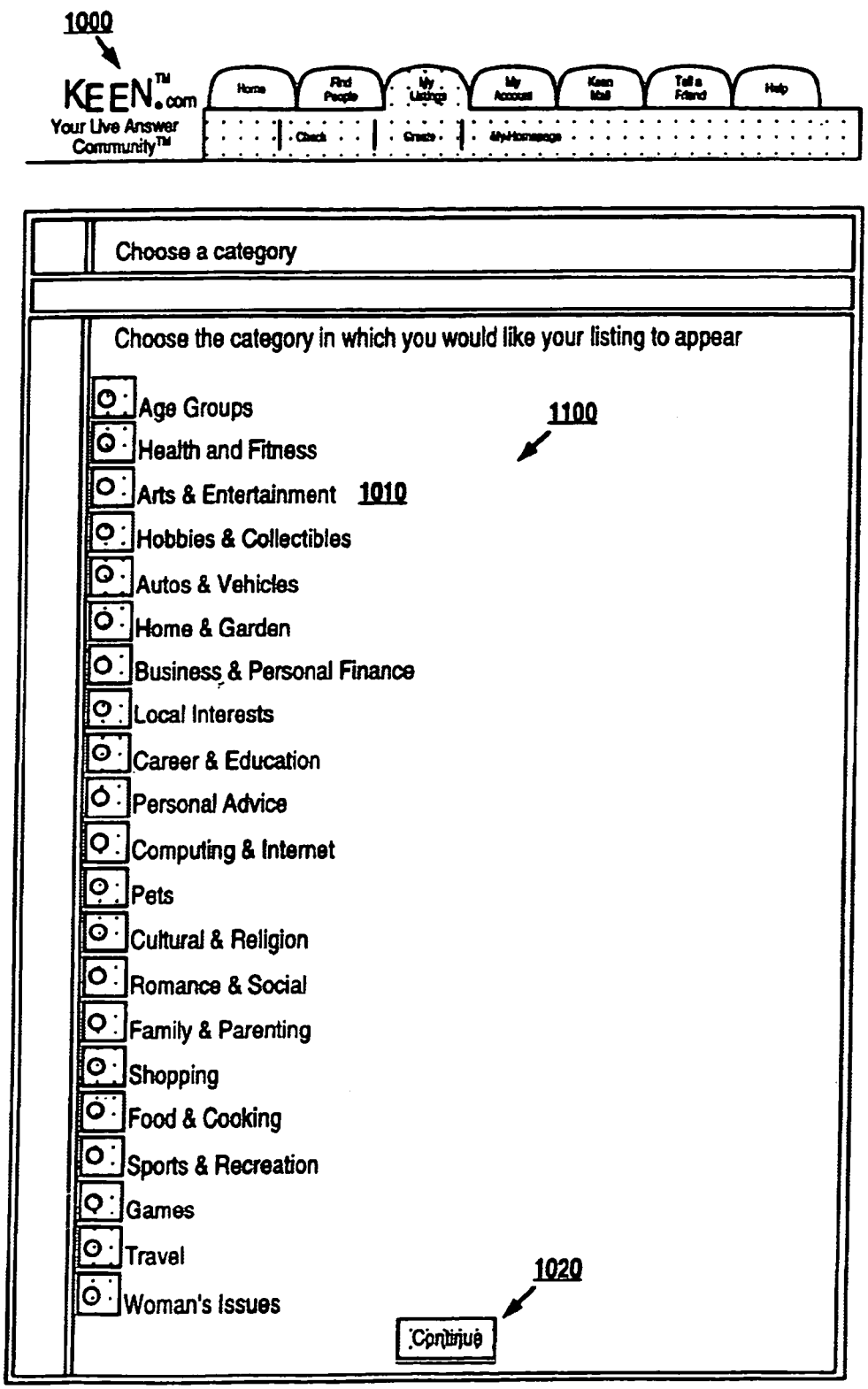
FIG. 3 illustrates one embodiment of a web page for selection of a category in which a listing for information appears in accordance with the present invention.

Once the username and password combination is successfully verified and the service provider has accessed the account, in one embodiment a logic unit within the controller computer 300 presents a web page 1000 as illustrated in FIG. 3. The web page 1000 requests the service provider to choose a category, e.g., Arts & Entertainment 1010, from a list of categories presented 1100.

Figure 4:
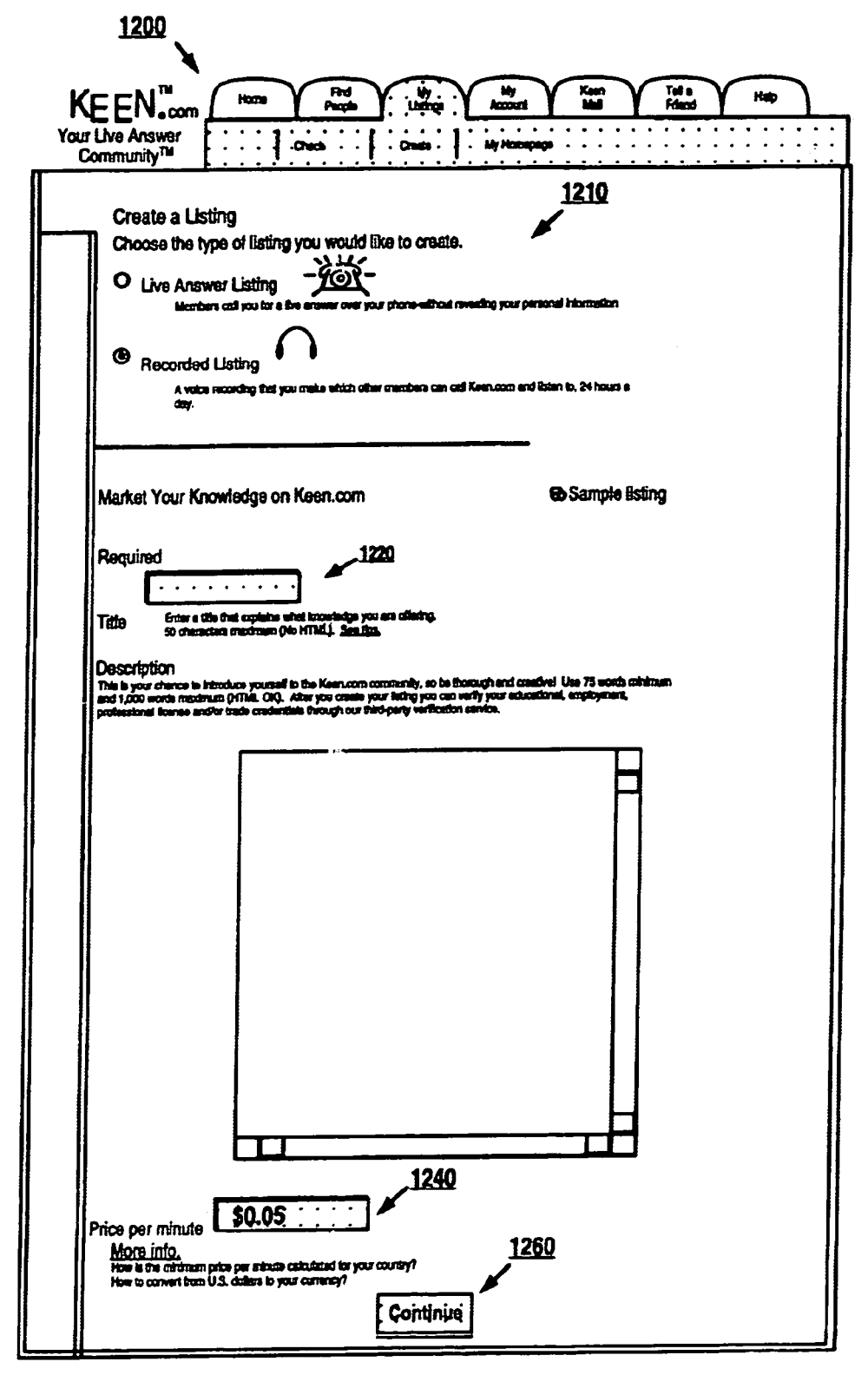

After the category is chosen, the service provider clicks on Continue 1020, and in one embodiment, a logic unit within the controller computer 300 then presents the service provider with a web page 1200 as illustrated in FIG. 4. The web page 1200 requests the service provider to create a listing for the information the service provider will be providing through the web site. In the embodiment shown in FIG. 4, the web site allows the service provider to list information in two formats, a live answer format or a recorded format. The live answer format is described in more detail in U.S. application Ser. No. 09/414,710, which is incorporated by reference in its entirety herein. Through this web page 1200, the controller computer requests the service provider to designate a format 1210, e.g., Recorded Listing, and to provide a title 1220 and a text description 1230 of the information that the service provider will be providing. The web page 1200 also requests the service provider to designate a price 1240 for the information to be provided. The embodiment in FIG. 4 shows the price 1240 as being a price per minute, but the price need not be a rate per period of time and may also include a flat price. As shown in FIG. 4A, the web page 1200 may accept additional descriptive information, such as a photo of the service provider, and offer the listing and the description in different languages.

Figure 5:
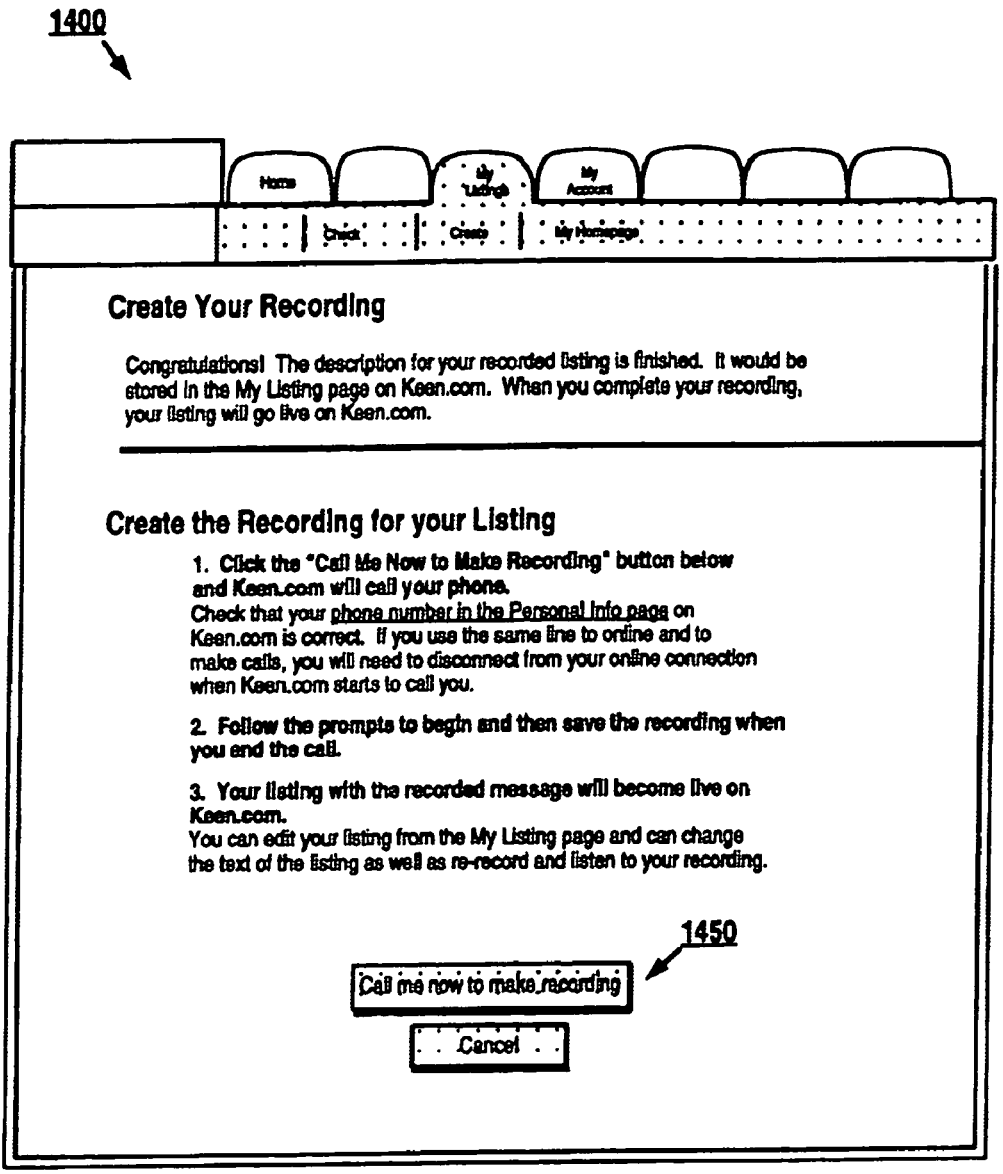
FIG. 5 illustrates one embodiment of a web page for recording information in accordance with the present invention.

After the service provider has finished creating the listing and the description, the service provider clicks on Continue 1260. Where the service provider has selected to provide information in a recorded format, in one embodiment, a logic unit within the controller computer 300 next presents the service provider with a web page 1400 as illustrated in FIG. 5, requesting that the service provider create the recording. Following the instructions provided on the web page 1400, the service provider will click on Call Me Now To Make Recording 1450, in response to which, a logic unit within the controller computer 300 will establish via the communications interface 700 a communications connection with the service provider.

In the embodiment depicted in FIG. 5, the logic unit within the controller computer 300 establishes a telephone connection with the service provider over a telephone network 600 by calling a telephone number saved on the database 310 in the account set up for the service provider. The controller computer 300, according to the present invention, may establish a communications connection over other types of communications networks, such as a computer network, satellite network, wireless communications network, direct TV network, etc., and the communications connection may include an audio, video, or other type of data connection.

Figure 7:
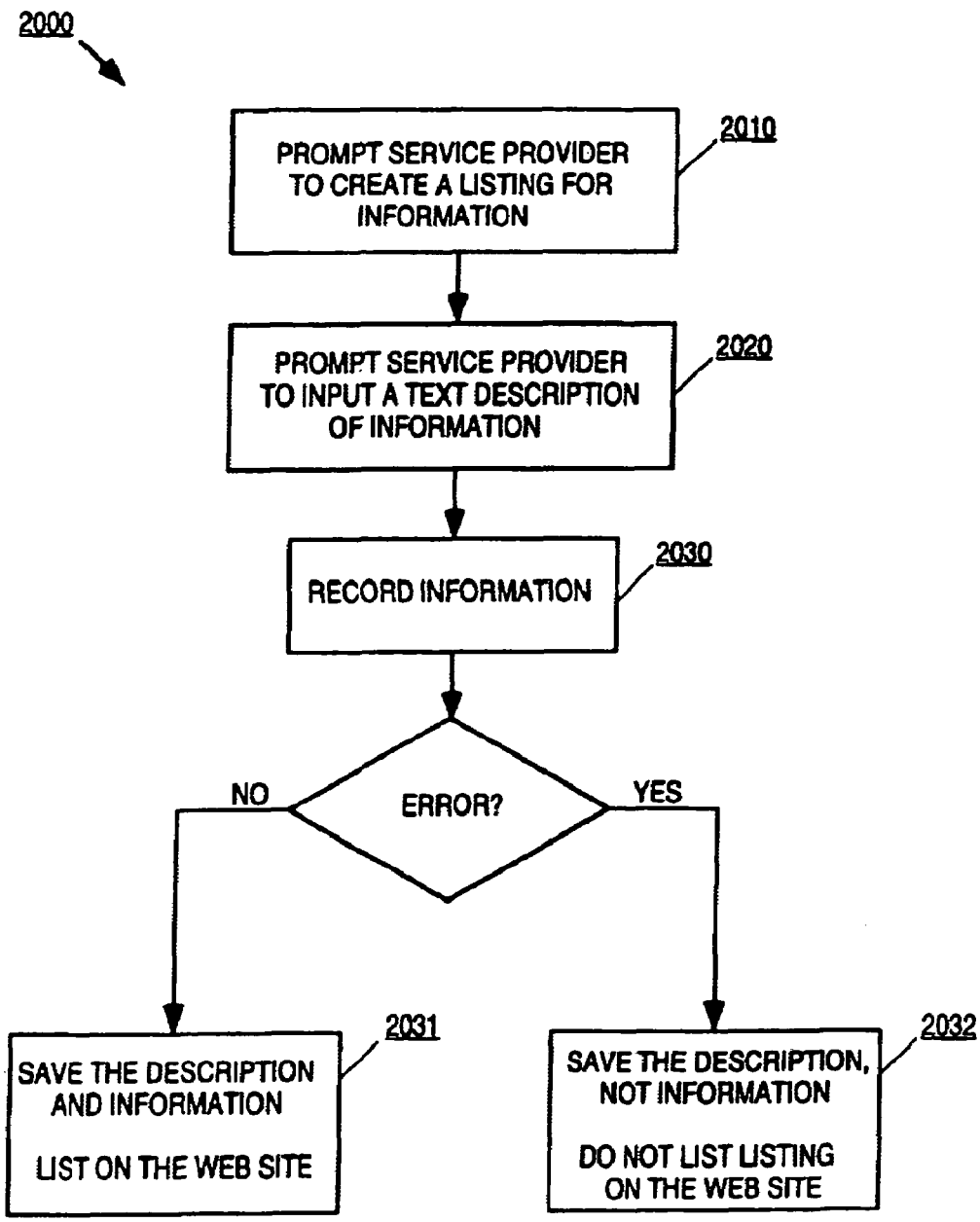
FIG. 7 is a flowchart that provides an overview of a process of creating a listing for recorded information according to one embodiment of the present invention.

FIG. 7 shows a flowchart 2000 that provides a general overview of the process of creating recorded information according one embodiment of the present invention. After registering with the web site and accessing the account set up for the service provider, the service provider is prompted to create a listing for the information that is to be recorded and distributed 2010. The controller computer 300 prompts the service provider to input a text description of the information 2020, and then prompts the service provider to record the information 2030. After the information is recorded, the listing is complete, and the controller computer 300 saves the information and the description in the service provider's account on the database 310, and lists the listing on the web site 2031. If an error occurs during recording, the controller computer 300 will save the text description but not the information and will not list the listing on the web site 2032.

Figure 8:
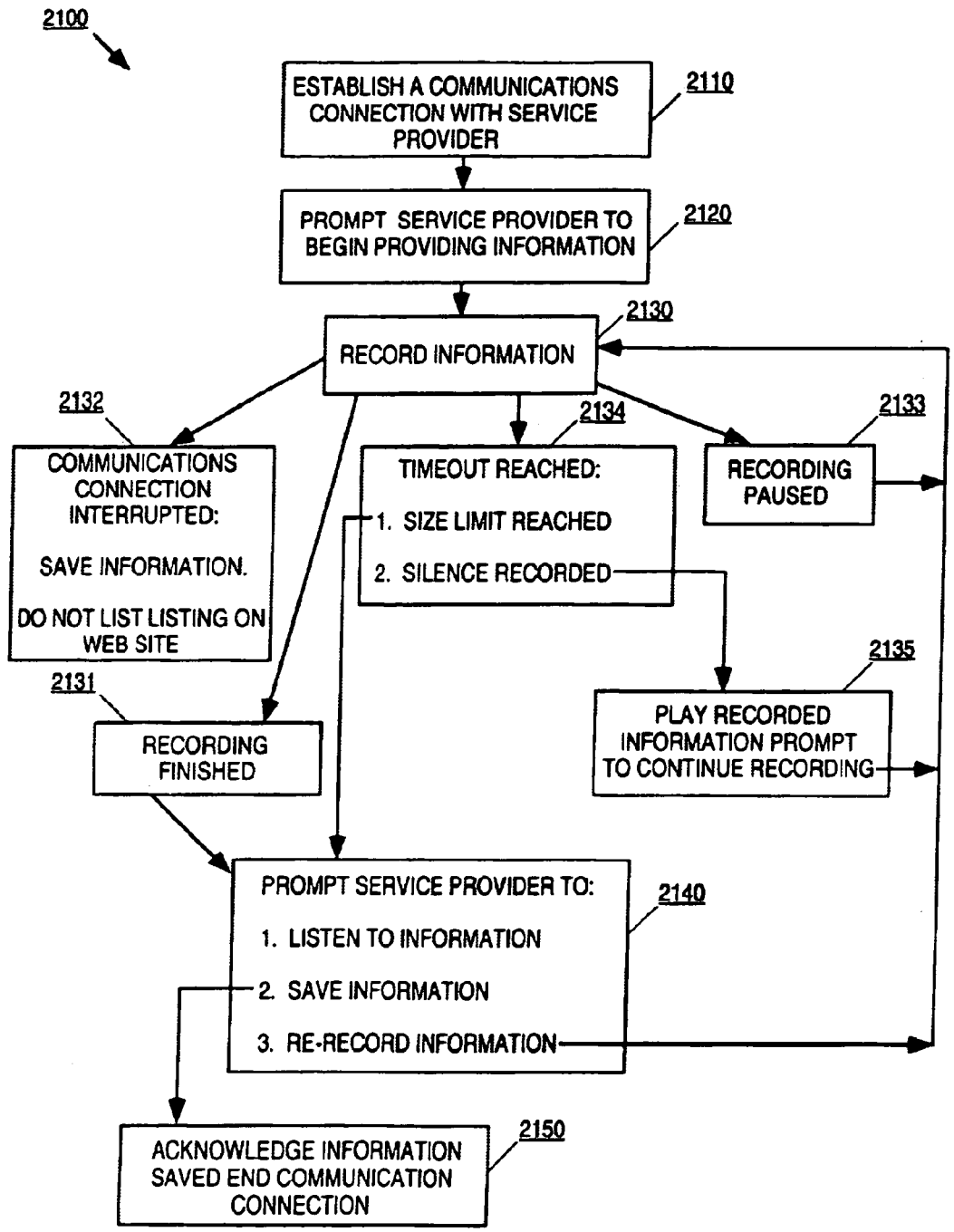
FIG. 8 is a flowchart of a process for recording information according to one embodiment of the present invention.

FIG. 8 provides a flowchart 2100 that details a process by which the service provider records the information in accordance with one embodiment of the present invention. In this embodiment, the information includes a voice-over recording that is recorded via a telephone connection. The telephone connection may be established over a telephone network or over a computer network, e.g., Internet telephony. The flowchart 2100 starts after the service provider has clicked on Call Me Now To Make Recording 1450 (see FIG. 5) with a logic unit within the controller computer 300 establishing via the telephone interface 700 a telephone connection with the service provider. In other words, the controller computer 300 calls the service provider 2110 via the telephone interface 700 using a telephone number stored as part of the service provider's account in the database 310. When the service provider accepts the telephone call, the logic unit within the controller computer 300 prompts the service provider to begin providing information to be recorded 2120. The prompt may include instructions to the service provider for how to end the recording, how to pause and restart the recording, etc. The recording then begins 2130, with the controller computer 300 recording aural information provided by the service provider over the telephone connection. A number of possibilities exist at this point in the process.

One possibility is that the recording proceeds without a problem. When the service provider has finished providing the information, the service provider provides some indication, e.g., by pressing the #-key, to the controller computer 300 that he has finished 2131. In response, a logic unit within the controller computer 300 prompts the service provider to either listen to the information, save the information, or to re-record the information 2140. The service provider may indicate his choice by, e.g., pressing a number on the telephone keypad, or speaking a number into the telephone connection. If the service provider chooses to listen to the information, the controller computer 300 will play the information over the telephone connection and, at the end of the recording, return to 2140 and prompt the service provider to again choose to either listen (again) to the information, save the information, or to re-record the information. If the service provider chooses to save the information, the controller computer 300 acknowledges that the information has been saved, e.g., with a congratulatory message, and ends the communications connection 2150. If the service provider chooses to re-record the information, the controller computer 300 prompts the service provider to re-record the information, and then returns to 2130.

Another possibility that exists is that the communications connection is interrupted in the middle of recording the information, e.g., the service provider hangs up the telephone or otherwise becomes disconnected from the controller computer 300. If the communications connection is ended without the controller computer 300 receiving an indication that the service provider has finished recording the information, the controller computer 300 will save the information, but the listing for the information will not appear on the web site until the controller computer 300 receives a confirmation from the service provider that the information is ready for distribution 2132.

Another possibility is that the service provider will pause the recording before finishing, or will decide in the middle of recording the information to start over. The service provider may indicate his decision by, e.g., pressing the *-key, 2133. In response to receiving such an indication, the logic unit of the controller computer 300 will return to 2130 and begin the recording process anew.

Still another possibility is that the controller computer 300 reaches a "timeout" condition 2134. This may happen, e.g., when a size limit for the recorded information (either in terms length of time, e.g., 30 minutes, or computer or database memory) has been reached, or when the controller computer 300 records silence for a set length of time, e.g., 30 seconds. If the timeout condition is reached because the recorded information has reached the size limit, the controller computer 300 will proceed to 2140 and prompt the service provider as though the controller computer 300 has received an indication that service provider was finished. If the timeout condition is reached because the controller computer 300 has recorded silence for the set length of time, then the controller computer 300 will prompt the service provider that nothing has been recorded for the set length of time and play what information has been recorded 2135.

After the recorded part of the information is played back, the controller computer will prompt the service provider to continue recording and return to 2130. If the controller computer again records only silence for the set length of time, the controller computer 300 will terminate the communications connection without having saved any of the information.

Once the controller computer 300 receives confirmation from the service provider to save the information, a logic unit within the controller computer 300 that is linked with the database 310 will save the recorded information in the service provider's account on the database 310. A system according to the present invention allows the service provider to access the account at any time to change or update the listing, the description, and/or the recorded information. To update the listing, description or the recorded information, in one embodiment the controller computer 300 would provide to the service provider the same or similar web pages as those illustrated in FIGS. 3-5 and record the information in the same or similar manner as described in FIG. 8.

In one embodiment, after the recorded information has been saved, a system according to the present invention previews the service provider's listing for the service provider prior to making the listing accessible to all of the users who browse the web site. FIG. 6 illustrates one embodiment of a preview web page 1500 in accordance with the present invention that the controller computer 300 may present on the service provider computer 200 via the computer connection. As illustrated in FIG. 6, each listing is previewed with a Listing Title 1501, Listing Type 1502 (Recorded or Live Answer), Availability 1503, Feedback Rating 1504, Rate 1505 (per minute), and options to Change Listing 1506. In accordance with the present invention, other types of listing data may be previewed in addition or instead of the types listed in FIG. 6.

In San Fran Steven's Listings, shown in FIG. 6, San Fran Steven lists three types of information services, Sailing Tips 1510, Sailing Advisor 1520, and Sailing Tricks 1530. Sailing Tips 1510 is a recorded format information service, as indicated by the word "Recorded" 1512 as well as by the image of the headphones 1513. Because Sailing Tips is a recorded format information service, it is always available for listening, as indicated by the words "Always Available" 1514. The listing 1510 further shows the date the recording was last updated 1515. In one embodiment, a system according to the present invention provides a feedback rating, based upon evaluations provided by users who have purchased the information previously. As shown in FIG. 6, San Fran Steven's Sailing Tips 1510 has not been rated, as indicated by the words "Not Rated" 1516. The price for receiving San Fran Steven's Sailing Tips is listed at "25 cents" (per minute) 1517. The preview page embodiment shown in FIG. 6 coveys the listing information mostly with words or as text messages, but those of ordinary skill in the art will recognize that the listing information may be conveyed with images (e.g., the headphones 1513 to indicate the recorded information format) or other symbols.

On the preview page shown in FIG. 6, three options are offered to change the listing 1518 for San Fran Steven's Sailing Tips. By selecting one of the options, the service provider may update, delete, or listen to the Sailing Tip. If the service provider selects "Update", the controller computer 300 starts a process such as those described above, with reference to FIGS. 3-5 and 7-8. If the service provider chooses "Delete", the controller computer 300 will delete the listing, the description and the recorded information being stored in the database 310. If the service provider chooses "Listen", the controller computer 300 will establish a communications connection with the service provider (as described above) and play the recorded information over the communications connection for the service provider.

FIG. 6 shows similar listing information about San Fran Steven's Sailing Advisor 1520 and Sailing Tricks 1530. Sailing Advisor is a live answer format information product, as indicated by the words "Live Answer" 1522 as well as by the telephone image 1523. The Sailing Advisor listing 1520 further gives an indication of the service provider's current availability 1524, which the service provider may change by selecting the unmarked box. As a live answer format product, the service provider further has the option of creating a schedule 1525 as part of the listing to indicate when the service provider is available to provide live answers, as described in more detail in U.S. application Ser. No. 09/414, 710. Sailing Tricks is another recorded format information product, as shown by the words "Recorded" 1532 and the headphone image 1533. The listing 1530 indicates that Sailing Tricks has not yet been recorded and directs the service provider to click "Update" 1534 in order to record the information. In the embodiment illustrated in FIG. 6, the preview web page also provides other information 1540 and marketing tips 1550 that the service provider may find useful.

Once the recorded information has been saved and listing, description and recorded information confirmed, the recorded information becomes available for sale to all of the users who browse the web site. Access to the web site may be established as described above, with the customer using a user computer ("customer computer") 100 to connect to a network 500 and then entering the URL of the controller computer 300. A logic unit within the controller computer 300 then establishes a computer connection with the customer computer 100.

After the computer connection has been established, in one embodiment customers will have the option of executing a keyword search for service providers. The keyword search can be executed from a web page presented by a logic unit of the controller computer 300 on the customer computer 100. Persons skilled in the art will recognize that a keyword search consists of scanning a database for words that match the keywords entered. In this embodiment, the keyword search will be executed against the descriptions and listing data stored in the database 310 maintained on the controller computer 300. In one embodiment, customers will view a list of service providers matching the keyword search criteria on a web page presented by the logic unit on the customer computer. Customers will have the option of viewing the service providers listed according to price, availability, or customer evaluations in either ascending or descending order. Persons skilled in the art will recognize that the service providers can be listed in any number of ways. As an alternative to a keyword search, customers can select a category to view a predetermined list of service providers. In one embodiment as described above with reference to FIG. 3, the service provider selects the categories in which the listings for his information services will appear.

In one embodiment, the list of service providers includes a description of each information service provided by the service provider. The customer can select to receive the information described, e.g., by clicking on the description or on a link included with the description. If the customer selects to receive a recorded information product, a logic unit within the controller computer 300 will respond by establishing via the communications interface 700 a communications connection with the customer. The communications connection may be established over a telephone network, a computer network, satellite network, wireless communications network, direct TV network, or other type of communications network, and may include an audio connection, video connection, or other type of data connection.

Figure 9:
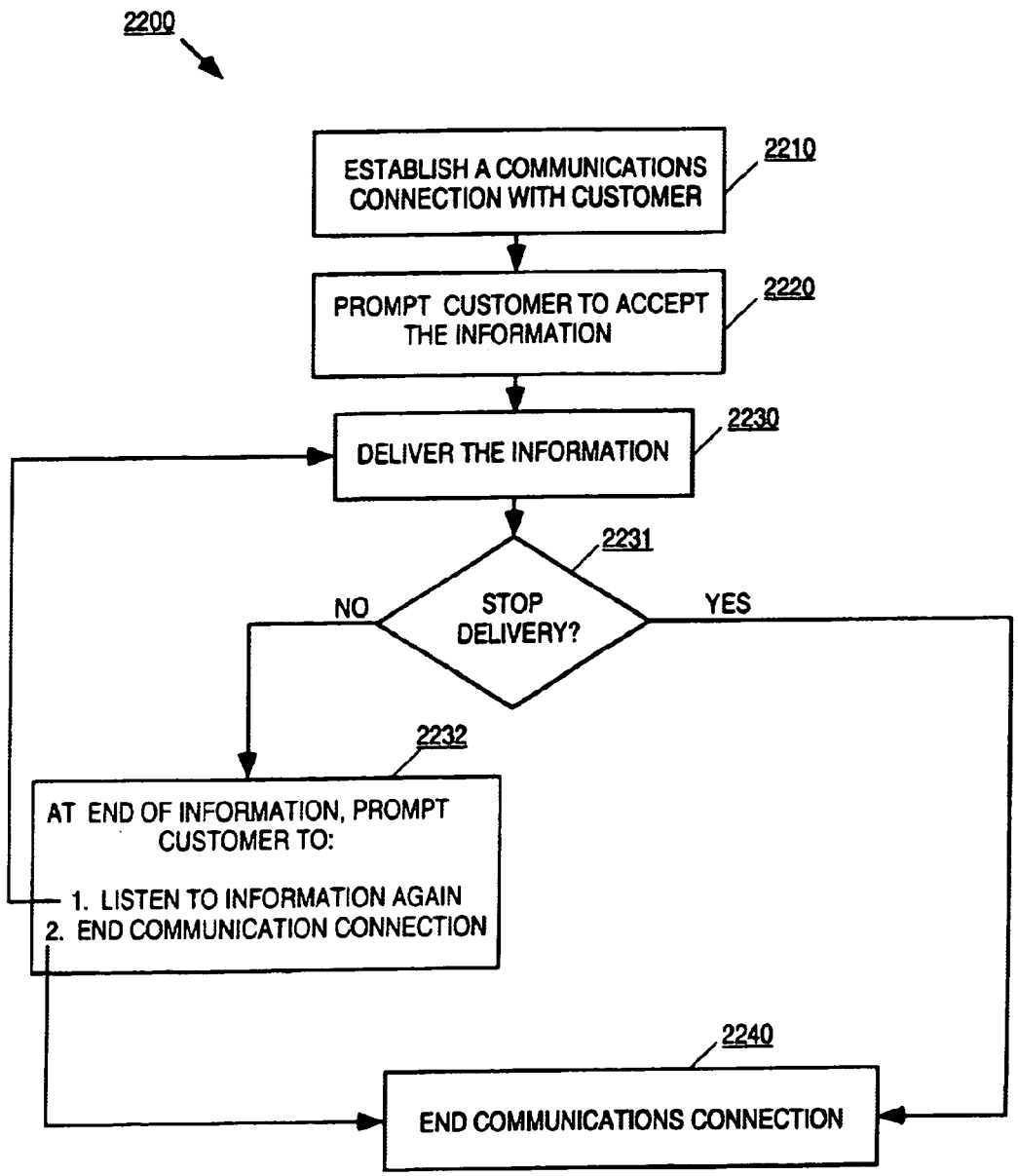
FIG. 9 is a flowchart of a process by which a user receives recorded information according to one embodiment of the present invention.

FIG. 9 provides a flowchart 2200 that details a process by which the customer receives the recorded information in accordance with one embodiment of the present invention. In this embodiment, the recorded information includes a voice-over recording and the communications connection is a telephone connection that may be established over a telephone network or over a computer network, e.g., Internet telephony. The flowchart 2200 starts after the customer has selected to receive the recorded information with a logic unit within the controller computer 300 establishing a telephone connection with the customer. In other words, the controller computer calls the customer 2210 via the telephone interface 700 using a telephone number stored as part of the user account set up for the customer and stored in the database 310. Once the communications connection has been established, the logic unit within the controller computer 300 prompts the customer to accept the information 2220 by, e.g., pressing a certain number on the telephone keypad or by speaking a certain word into the telephone. Once the customer accepts, the logic unit, which is linked to the database 310 on which the recorded information is stored, delivers the recorded information to the customer over the telephone connection 2230.

At this point, the customer may choose either to stop delivery of the recorded information before its end or to listen to the recorded information to its end 2231. If the customer chooses to listen to the recorded information to its end 2231, the controller computer 300 will prompt the customer to choose to listen to the information again or to end the call 2232 by, e.g., pressing a number on the telephone keypad. If the customer chooses to listen to the information again, the controller computer 300 will re-send the information over the communications connection. If the customer chooses to end the call, the controller computer 300 will proceed to 2240, where the telephone connection is ended. In one embodiment, after providing the information to the customer, the controller computer 300 prompts the customer to submit an evaluation rating of the information that is stored on the database 310 as part of the description of the information.

Alternatively, the customer may choose to stop delivery of the information before it has reached its end. The customer may do this by, e.g., pressing the #-key on the telephone keypad or by hanging up. If the customer chooses to stop delivery of the information by providing an indication to the controller computer, e.g., by pressing the #-key, then the controller computer proceeds to 2240 and ends the telephone connection.

In one embodiment, the controller computer 300 according to the present invention has a logic unit to track how long the information is delivered to the customer. When the customer accepts the call 2220, the logic unit may begin a telephone call timer for the purpose of billing the customer for the information. As described above, the price for the information may be a rate per period of time or a fixed amount for each time the information is provided to the customer. In one embodiment, the logic unit automatically deducts an amount from the customer's user account when delivery of the information has stopped. Alternatively, the logic unit may deduct an amount equal to the rate charged by the service provider as the information is being delivered, i.e., while the communications connection is being maintained. If the telephone call has not been concluded when only a minute's worth of time is remaining (based on the rate charged by the service provider) on the user account, the controller computer 300 will prompt the customer to increase the credit in the user account, or to purchase additional time. If the customer does not increase the credit or purchased additional time, the controller computer 300 will prompt the customer to provide additional credit or payment before the call is terminated.

In one embodiment, the controller computer 300 records a summary of the transaction in the database 310 maintained on the controller computer 300 and updates the customer's user account and the service provider's account accordingly. The controller computer 300 additionally may send summary messages, e.g., via electronic mail, to both the service provider and the customer.

In one embodiment of a system according to the present invention, customers and service providers will be given a summary of account activity. This information may include services provided, services purchased, and the current month's billing and payment summary. Customers and service providers also may have the option of viewing the previous month's billing and payment summary as well as the next month's billing and payment summary.

EXAMPLE

A comedian named Peter offers a service to his audience that he calls "Joke of the Day," in which he tells a joke that is particularly relevant to current events and today's celebrities. He has described this service at the subject web site under "Humor" in a listing that indicates the comedian's description, photograph, credentials, and a 50-cent price per minute to listen to the "Joke of the Day." In order to record the joke each morning, Peter goes to the subject web site, and clicks on "Call Me Now to Make Recording." The web site instantly calls him on his telephone and prompts him to speak his new recording. The new joke is recorded and stored on the web site.

A customer named Linda, who would like to hear a "Joke of the Day," goes to the subject web site. She looks in the Humor section and finds several listings of comedians with different descriptions and prices. After choosing to listen to Peter's joke, she clicks on the "Call Me Now" button. Her telephone instantly rings and she is played a recording of Peter's joke of the day. She listens for three minutes, and then hangs up. Her credit card is charged a total of $1.50 for the three minutes (at 50 cents per minute). Peter's online account is credited the $1.50 minus a fee collected by the web site.

Those of ordinary skill in the art will recognize that this example and the embodiments described above are illustrative only and do not in any way limit the range of applications of the present invention. Numerous modifications, variations, and improvements may be made to the example and the embodiments described above that still fall within the scope of the invention as claimed.

What is claimed is:

1. A computer system, comprising:
a memory to store a database;
a first logic unit linked with the database to establish a first communications connection with an information provider and to record a first communication in real time as the first communication is being articulated by the information provider over the first communications connection, the database to store the first recorded communication, wherein the database further stores information about an account set up for the information provider;

a second logic unit to provide to a user a list of recorded communications including the first recorded communication, the list including a rate per period of time to access a respective recorded communication, and the list including a user selectable link for the respective recorded communication, which when selected causes a central controller to facilitate establishing a connection with the user to provide the selected recorded communication to the user;

in response to the user selecting the user selectable link of a recorded communication from the list of recorded communications, the central controller to facilitate establishing a connection with the user to provide the selected recorded communication to the user; and a third logic unit to bill the user in response to providing the selected communication to the user, wherein the third logic unit is to track how long the selected recorded communication is delivered to the user and to credit to the account an amount based upon how long the selected recorded communication is delivered minus a fee.

2. The system as described in claim 1, wherein the database further stores a description of the the first communication.

3. The system as described in claim 2, further comprising a fourth logic unit linked with the database to establish a computer connection with an information provider computer and to receive via the computer connection the description from the information provider.

4. The system as described in claim 3, wherein the computer connection is established through a web site accessible by the information provider computer.

5. The system as described in claim 2, wherein the second logic unit is to establish a computer connection with a user computer and to deliver the description to the user computer via the computer connection.

6. The system as described in claim 5, wherein the computer connection is established through a web site accessible by the user computer.

7. The system as described in claim 1, wherein the first communications connection includes an audio connection.

8. The system as described in claim 1, wherein the first communications connection includes a video connection.

9. The system as described in claim 1, wherein the first communications connection is established over a computer network.

10. The system as described in claim 1, wherein the first communications connection is established over a telephone network.

11. The system as described in claim 1, wherein the second communications connection includes an audio connection.

12. The system as described in claim 1, wherein the second communications connection includes a video connection.

13. The system as described in claim 1, wherein the second communications connection is established over a computer network.

14. The system as described in claim 1, wherein the second communications connection is established over a telephone network.

15. The system as described in claim 1, further comprising a fourth logic unit to track how long the selected recorded communication is delivered to the user and the third logic unit bills the user based upon how long the selected recorded communication is delivered.

16. The system as described in claim 1, wherein the database further stores information about a user account.

17. The system as described in claim 16, wherein the third logic unit is to deduct an amount from the user account for the selected recorded communication.

18. The system as described in claim 16, wherein the third logic unit is to track how long the selected recorded communication is delivered to the user and to deduct from the user account an amount based upon how long the selected recorded communication is delivered.

19. The system of claim 1, wherein the first communications connection further comprises a telephone connection that supports two way voice communication that is at least one of a two way live conversation, a one way recording, or a one way live communication.

20. A method of information recording and delivering, the method comprising:

establishing a first communications connection with an information provider;

recording a first communication in real time as the first communication is being articulated by the information provider over the first communications connection;

providing to a user a list of recorded communications, including the first recorded communication, the list including a rate per period of time to access a respective recorded communication, and the list including a user selectable link for the respective recorded communication, which when selected causes a central controller to facilitate establishing a connection with the user to provide the selected recorded communication to the user;

in response to the user selecting the user selectable link of a recorded communication from the list of recorded communications, the central controller facilitating establishing a connection with the user to provide the selected recorded communication to the user; and billing the user in response to providing the selected communication to the user, comprising tracking how long the selected recorded communication is delivered to the user and crediting to an account set up for the information provider an amount based upon how long the selected recorded communication is delivered minus a fee.

21. The method as described in claim 20, further comprising:

storing a description of the first recorded communication provided by the information provider; and including the description within the list of recorded communications.

22. The method as described in claim 21, further comprising:

establishing a first computer connection with an information provider computer; and receiving the description from the information provider over the first computer connection.

23. The method as described in claim 21, further comprising:

establishing a second computer connection with a user computer, wherein the list of recorded communications is delivered to the user via the second computer connection.

24. The method as described in claim 21 wherein the list is delivered to the user in response to a keyword search.

25. The method as described in claim 21 wherein the list is delivered to the user in response to a category selection.

26. The method as described in claim 20, wherein the first communications connection includes an audio connection.

27. The method as described in claim 20, wherein the first communications connection includes an a video connection.

28. The method as described in claim 20, wherein the first communications connection is established over a computer network.

29. The method as described in claim 20, wherein the first communications connection is established over a telephone network.

30. The method as described in claim 20, wherein the second communications connection includes an audio connection.

31. The method as described in claim 20, wherein the second communications connection includes a video connection.

32. The method as described in claim 20, wherein the second communications connection is established over a computer network.

33. The method as described in claim 20, wherein the second communications connection is established over a telephone network.

34. A machine readable medium having stored thereon a set of instructions, which when executed, perform a method comprising:

establishing a first communications connection with an information provider;

recording a first communication in real time as the first communication is being articulated by the information provider over the first communications connection;

providing to a user a list of recorded communications, including the first recorded communication, the list including a rate per period of time to access a respective recorded communication, and the list including a user selectable link for the respective recorded communication, which when selected causes a central controller to facilitate establishing a connection with the user to provide the selected recorded communication to the user;

in response to the user selecting the user selectable link of a recorded communication from the list of recorded communications, the central controller facilitating establishing a connection with the user to provide the selected recorded communication to the user; and billing the user in response to providing the selected communication to the user, comprising tracking how long the selected recorded communication is delivered to the user and crediting to an account set up for the information provider an amount based upon how lone the selected recorded communication is delivered minus a fee.

35. A system for information recording and delivering, the system comprising:

means for establishing a first communications connection with an information provider;

means for recording a first communication in real time as the first communication is being articulated by the information provider over the first communications connection;

means for providing to a user a list of recorded communications, including the first recorded communication, the list including a rate per period of time to access a respective recorded communication, and the list including a user selectable link for the respective recorded communication, which when selected causes a central controller to facilitate establishing a connection with the user to provide the selected recorded communication to the user;

a central controller means for facilitating establishing a connection with the user to provide the selected recorded communication to the user, in response to the user selecting the user selectable link of a recorded communication from the list of recorded communications; and means for billing the user in response to providing the selected communication to the user, comprising means for tracking how long the selected recorded communication is delivered to the user and for crediting to an account set up for the information provider an amount based upon how long the selected recorded communication is delivered minus a fee.

* * * * *